Jan. 23, 1951 — I. SHAKOWITZ — 2,539,209
SLED
Filed Sept. 8, 1949 — 2 Sheets-Sheet 1
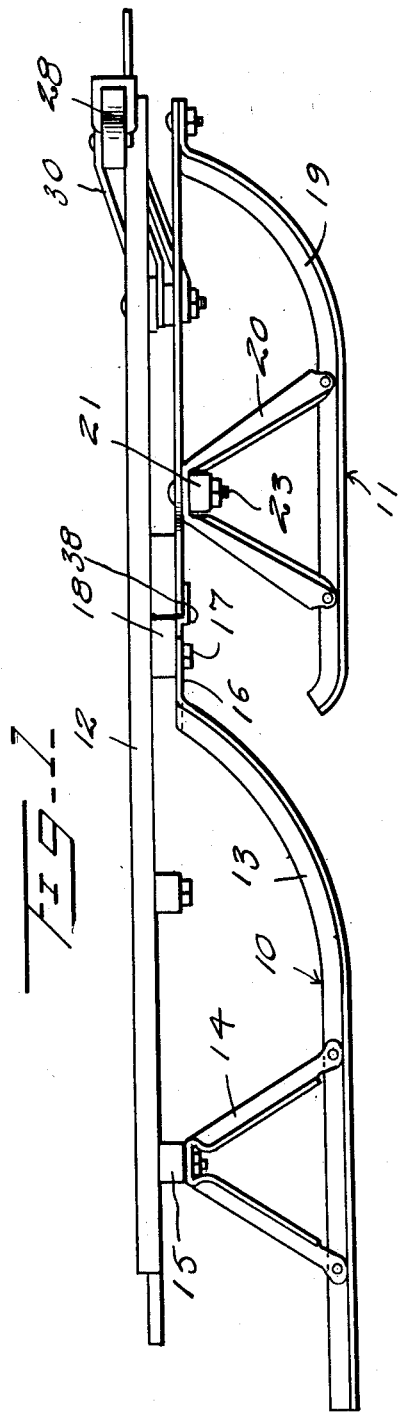
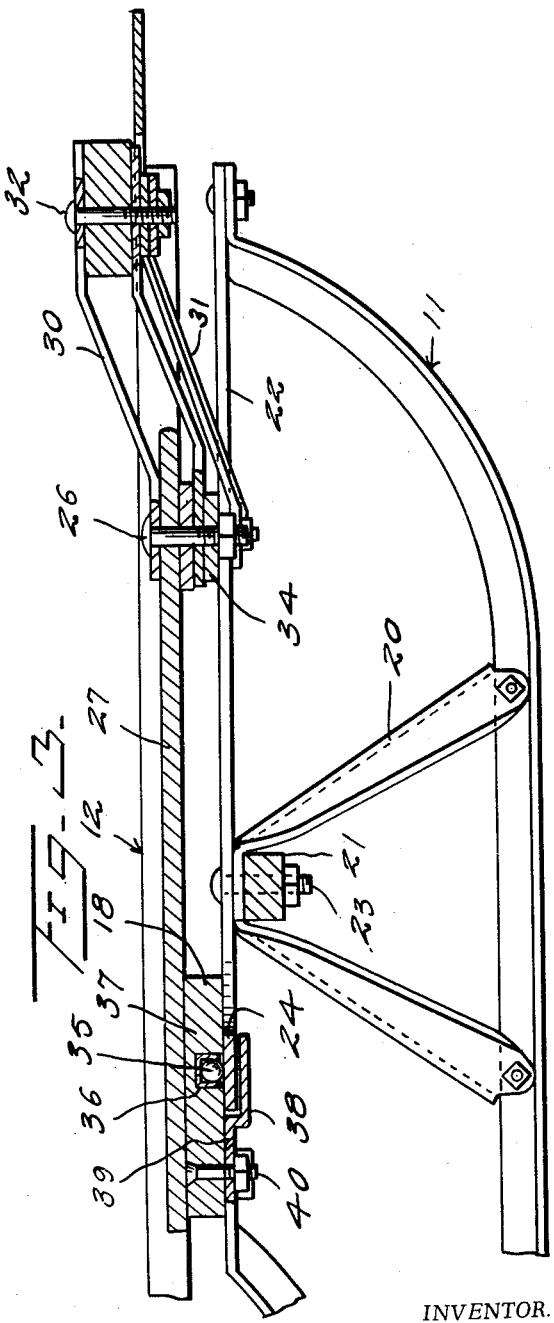
INVENTOR.
*Isidore Shakowitz*
BY
*Kimmel & Crowell* ATTORNEYS Jan. 23, 1951  I. SHAKOWITZ  2,539,209
SLED
Filed Sept. 8, 1949  2 Sheets-Sheet 2
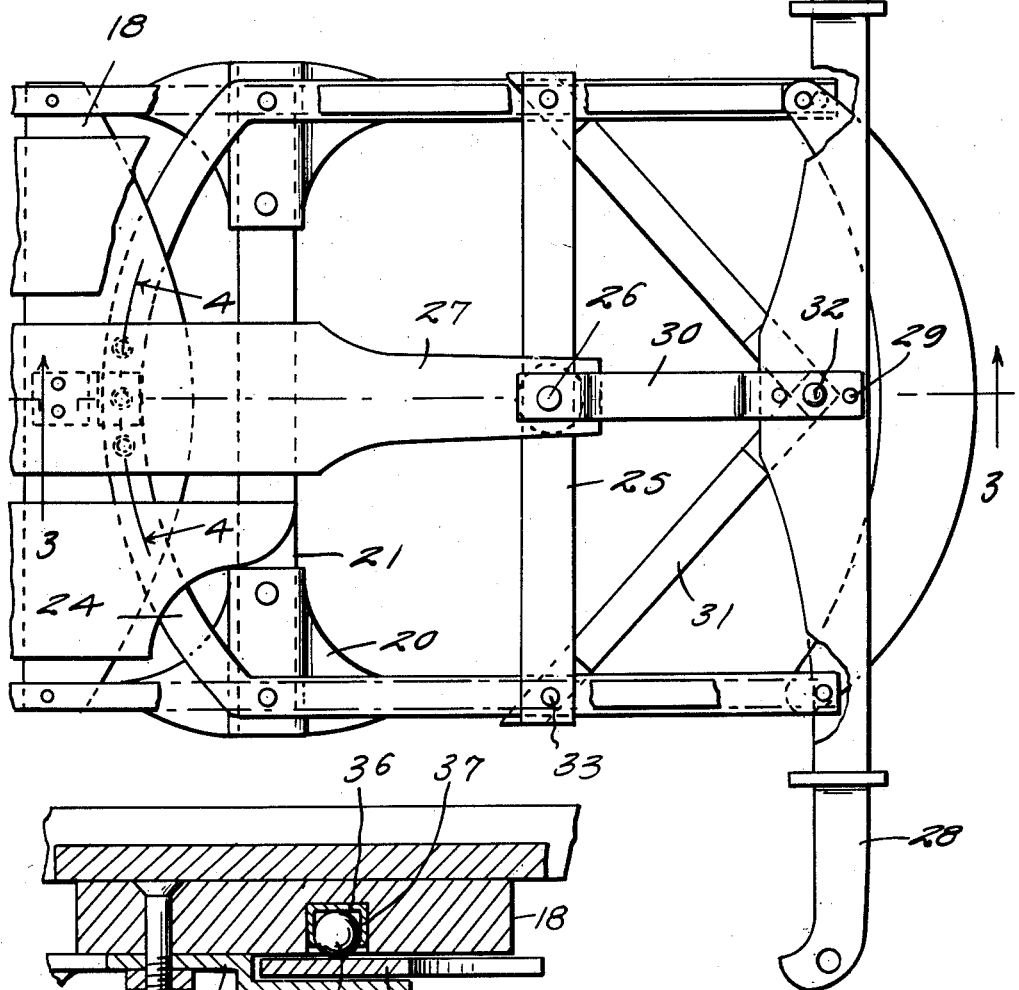
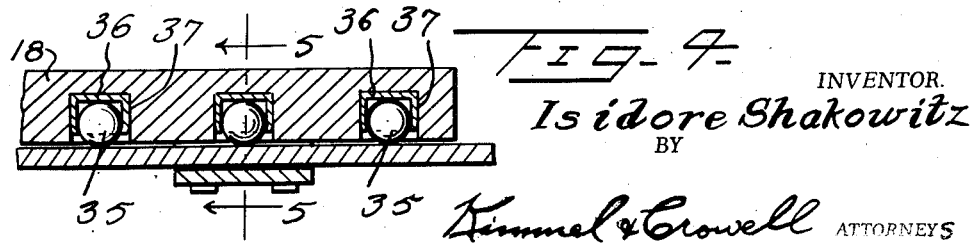
INVENTOR.
Isidore Shakowitz
BY
Kimmel & Crowell ATTORNEYS Patented Jan. 23, 1951

2,539,209

UNITED STATES PATENT OFFICE 2,539,209

SLED

Isidore Shakowitz, Philadelphia, Pa.

Application September 8, 1949, Serial No. 114,469

1 Claim. (Cl. 280—16)

This invention relates to sleds and is an improvement over the construction shown in my prior Patent No. 2,455,318 issued November 30, 1948, for Sleds.

An object of this invention is to provide a steerable sled embodying front and rear runners, with the front runners connected together and pivotally secured to the top.

Another object of this invention is to provide a sled having steerable front runners wherein an arcuate bar is connected between the front runners and anti-friction means is provided beneath the top for engagement with the bar so that the front runners can be turned easily and will not bind under the weight of a person on the top.

With the above and other objects in view, my invention consists in the arrangement, combination and details of construction disclosed in the drawings and specification, and then more particularly pointed out in the appended claim.

In the drawings,

Figure 1 is a detail side elevation of a bobsled constructed according to an embodiment of this invention, Figure 2 is a fragmentary plan view of the bobsled, Figure 3 is a fragmentary sectional view taken on the line 3—3 of Figure 2, Figure 4 is a fragmentary sectional view taken on the line 4—4 of Figure 2, Figure 5 is a fragmentary sectional view taken on the line 5—5 of Figure 4.

Referring to the drawings, the numerals 10 and 11 designate generally rear and front sled members which are secured to a top 12. The rear sled member 10 is formed of a pair of runners 13 which have inverted V-shaped bars 14 secured thereto between the ends thereof, and the bars 14 are secured to a transverse bar 15 which is fixed to the top 12.

The forward ends of the rear runners 13 are bent horizontally as indicated at 16 and secured by fastening means 17 to a cross-piece 18 which is fixed beneath the top 12. The front sled 11 is formed of a pair of runners 19 having inverted V-shaped bars 20 secured thereto and the two runners 19 are connected together by means of a connecting bar 21. Each runner 19 has secured to the upper forward end thereof a horizontally disposed bar 22 which is fixed by fastening means 23 to the bar 21 over the top of each V-shaped member 20, and the upper side bars 22 extend rearwardly and have fixed thereto or formed integral therewith a transversely arcuate bar 24.

A cross bar 25 is fixed between the side bars 22 and a pivot member 26 extends through a forwardly projecting member 27 carried by the top 12 and also extends through the cross-bar 25. A steering bar 28 is fixed by fastening means 29 to a pair of spaced apart straps 30 which extend rearwardly from the central portion of the bar 28 and pivotally engage the pivot member 26 on the upper and lower sides of the top extension 27.

A pair of rearwardly divergent bracing members 31 are secured at their convergent ends by fastening means 32 to the central portion of the steering bar 28 and are secured by fastening means 33 to the side bars 22. A spacer member 34 is interposed between the lower one of the straps 30 and the upper side of the cross bar 25 so that the side bars 22 of the front sled 11 will be disposed in parallel relation with the top 12.

In order to provide a means whereby the front sled 11 may freely swing about the pivot member 26 when a person is mounted on the top 12 I have provided a plurality of anti-friction balls 35 which are loosely carried by socket members 36. The socket members 36 are mounted in recesses 37 formed in the lower side of the bar 18 and the several sockets 36, with the balls 35 so arranged on the same curvature as the curvature of the arcuate bar 24.

A guide member 38 is engaged loosely beneath the arcuate bar 24, being formed with a rear upwardly offset portion 39 which is secured by a fastening member 40 to the cross bar 18.

With a sled as hereinbefore described, the front sled 11 may be freely and easily turned by forward pressure on either end portion of the steering bar 28. When a person is mounted on the top 12 the anti-friction balls 35 will engage the arcuate bar 24, thereby eliminating substantially any friction between the bar and the cross bar 18.

I do not mean to confine myself to the exact details of construction herein disclosed, but claim all variations falling within the purview of the appended claim.

What I claim is:

A bobsled comprising a flat top member, a pair of rear runners fixed beneath said member, a front sled formed of a pair of connected together runners, means pivotally securing said front sled to said top member, a steering bar fixed relative to said front sled, a longitudinally curved bar fixed to the upper rear portion of said front sled, anti-friction means beneath said top and engaging the upper side of said curved bar, said anti-friction means comprising a plurality of spaced apart balls, a socket for each ball, a cross bar fixed beneath said top member, said sockets being countersunk in said cross bar, and a guide forming strap fixed relative to said top member and extending beneath said curved bar.

ISIDORE SHAKOWITZ.

REFERENCES CITED

The following references are of record in the file of this patent:

UNITED STATES PATENTS

| Number | Name | Date |
|---|---|---|
| 705,943 | Miller | July 29, 1902 |
| 2,095,951 | Andrus | Oct. 19, 1937 |
| 2,455,318 | Shakowitz | Nov. 30, 1948 |
| 2,474,373 | Seiden | June 28, 1949 |